United States Patent
Ji

(10) Patent No.: US 10,916,021 B2
(45) Date of Patent: Feb. 9, 2021

(54) VISUAL TARGET TRACKING METHOD AND APPARATUS BASED ON DEEPLY AND DENSELY CONNECTED NEURAL NETWORK

(71) Applicant: Beijing Moviebook Science and Technology Co., Ltd., Beijing (CN)

(72) Inventor: Xiaochen Ji, Beijing (CN)

(73) Assignee: BEIJING MOVIEBOOK SCIENCE AND TECHNOLOGY CO., LTD., Beijing (CN)

( * ) Notice: Subject to any disclaimer, the term of this patent is extended or adjusted under 35 U.S.C. 154(b) by 66 days.

(21) Appl. No.: 16/503,655

(22) Filed: Jul. 5, 2019

(65) Prior Publication Data
US 2020/0327679 A1    Oct. 15, 2020

(30) Foreign Application Priority Data

Apr. 12, 2019   (CN) .......................... 2019 1 0294717

(51) Int. Cl.
| | |
|---|---|
| *G06K 9/00* | (2006.01) |
| *G06T 7/246* | (2017.01) |
| *G06T 7/73* | (2017.01) |
| *G06T 7/00* | (2017.01) |
| *G06T 11/20* | (2006.01) |

(52) U.S. Cl.
CPC ............. *G06T 7/248* (2017.01); *G06T 7/74* (2017.01); *G06T 7/97* (2017.01); *G06T 11/20* (2013.01); *G06T 2207/10016* (2013.01); *G06T 2207/20081* (2013.01); *G06T 2207/20084* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 10,049,297 B1* | 8/2018 | Chen ................. | G06K 9/00691 |
| 2007/0165904 A1* | 7/2007 | Nudd ................ | G06K 9/00442 |
| | | | 382/100 |
| 2007/0189627 A1* | 8/2007 | Cohen ............... | G06K 9/00228 |
| | | | 382/254 |
| 2016/0042253 A1* | 2/2016 | Sawhney ............ | G06K 9/6218 |
| | | | 382/190 |
| 2016/0174902 A1* | 6/2016 | Georgescu ........... | G06T 7/0012 |
| | | | 600/408 |
| 2017/0091950 A1* | 3/2017 | Munteanu ............... | G06T 7/269 |
| 2017/0132472 A1* | 5/2017 | Tao ......................... | G06N 3/08 |

* cited by examiner

*Primary Examiner* — Hadi Akhavannik
(74) *Attorney, Agent, or Firm* — Bayramoglu Law Offices LLC

(57) ABSTRACT

A visual target tracking method and apparatus based on a deeply and densely connected neural network. The method includes: a data input step: inputting a target image of a first video frame and a second video frame in video data into a deeply and densely connected neural network; a target tracking step: performing, based on the target image, target detection on the second video frame by using the trained deeply and densely connected neural network; and a tracking result output step: outputting bounding box coordinates and a similarity graph of a target in the second video frame, determining the length and width of the target based on the bounding box coordinates, and determining a center position of the target based on the position of a maximum value in the similarity graph.

13 Claims, 5 Drawing Sheets

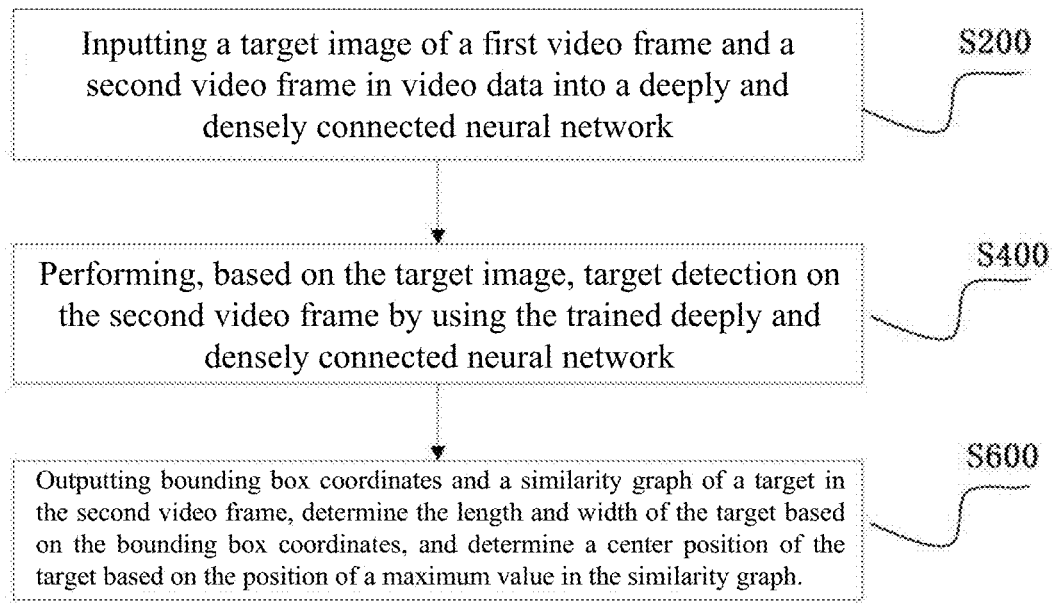
Fig. 5
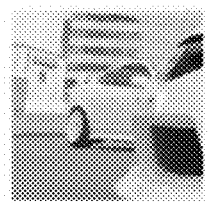 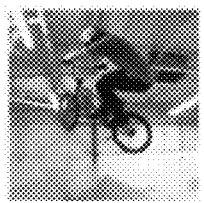 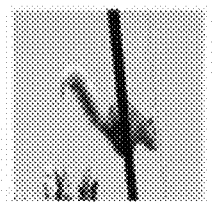
Fig. 6A  Fig. 6B  Fig. 6C
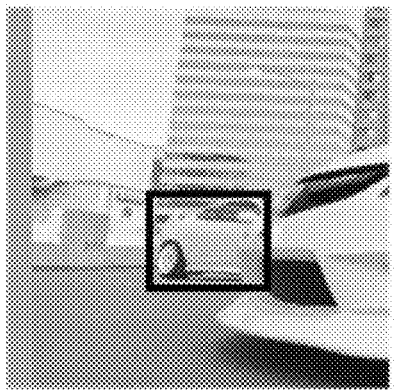 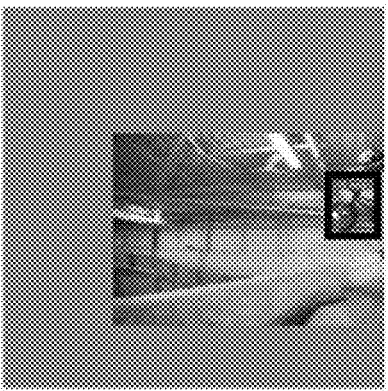 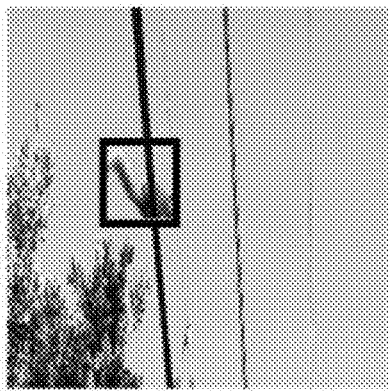
Fig. 6D  Fig. 6E  Fig. 6F

VISUAL TARGET TRACKING METHOD AND APPARATUS BASED ON DEEPLY AND DENSELY CONNECTED NEURAL NETWORK

CROSS REFERENCE TO THE RELATED APPLICATIONS

This application is based on and claims priority from Chinese Patent Application 201910294717.4, filed on Apr. 12, 2019, the entire contents of which are incorporated herein by reference.

TECHNICAL FIELD

The present application relates to the field of computer vision, and in particular to a visual target tracking method and apparatus based on a deeply and densely connected neural network.

BACKGROUND

In the field of computer vision, how to track an arbitrary target in a video sequence is a very challenging problem. Firstly, due to the uncertainty of a target category, an algorithm needs to have the capability of extracting robust features of a target. Secondly, the accumulation of errors during tracking may cause tracking failure, and therefore, the algorithm needs to be able to accurately locate the target. At the same time, many application scenarios require a tracking algorithm to run in real time. Because traditional manual features cannot meet requirements for robustness, when changes such as non-rigid deformation, out-of-plane rotation, motion blur occur to the target, a traditional manual feature-based tracker is prone to tracking failure.

In recent years, with the development of a deep learning algorithm, a great success has been achieved in the depth feature-based algorithm. Since end-to-end training can be performed with use of a large amount of training data, a deep convolutional neural network can extract the target robust features by means of learning, which can adapt to various tracking environments (such as non-rigid deformation, out-of-plane rotation, and motion blur). At the same time, the tracking algorithm can locate the target more accurately by making full use of the features extracted by different convolutional layers.

An existing deep learning-based visual target tracking algorithm has the following disadvantages: Firstly, trackers only utilize deep features of a deep convolutional network, but shallow features are not fully utilized. However, since the shallow features have greater resolution, the shallow features can provide more accurate positional information. Secondly, the convolutional neural network used in most trackers only takes into account one of a regression loss and a classification loss during training process, and thus cannot train the network more comprehensively. Finally, because of the inability to learn robust features, many trackers need to fine-tune parameters of the deep convolutional neural network through online training, and this process makes the trackers fail to run in real time.

SUMMARY

An objective of the present application is to overcome the above problems or at least partially solve or alleviate the above problems.

According to a first aspect of the present application, a visual target tracking method based on a deeply and densely connected neural network is provided, the method comprising:

a data input step: inputting a target image of a first video frame and a second video frame in video data into a deeply and densely connected neural network;

a target tracking step: performing, based on the target image, target detection on the second video frame by using the trained deeply and densely connected neural network; and a tracking result output step: outputting bounding box coordinates and a similarity graph of a target in the second video frame, determining the length and width of the target based on the bounding box coordinates, and determining a center position of the target based on the position of a maximum value in the similarity graph.

The method uses the deeply and densely connected neural network to make full use of shallow features, thereby providing more accurate position information for target comparison and tracking.

Optionally, the deeply and densely connected neural network comprises: a first sub-network, a second sub-network, and a fully-connected layer, wherein an input of the first sub-network is the target image of the first video frame, an input of the second sub-network is the second video frame, the first sub-network and the second sub-network are both connected to the fully-connected layer, and the fully-connected layer has two output branches, which are a bounding box coordinate output branch and a similarity graph output branch, respectively.

The convolutional neural network model of the method adopts deep and dense connections. Through the setting of various connection relationships, not only can deep features be utilized, but also shallow features can be made full use of. Through the comprehensive utilization of the deep features and the shallow features, more accurate target location information can be generated, thereby making tracking results more stable.

Optionally, the first sub-network and the second sub-network have the same structure and share parameters.

The method can reduce the amount of data for weight calculation, and each neuron only cares for a few features, so that the number of parameters that need to be estimated is reduced, thereby increasing the calculation speed.

Optionally, the first sub-network and/or the second sub-network comprises: a first convolutional layer, a first pooling layer, a first densely connected block, a first conversion layer, a second pooling layer, a second densely connected block, a second conversion layer, a third pooling layer, a third densely connected block, a third conversion layer, a fourth pooling layer, and a splicing layer which are connected in sequence.

Optionally, the first densely connected block, the second densely connected block and the third densely connected block have the same structure, each comprising: three convolutional layers, wherein each convolutional layer has a convolution kernel size of 3×3 and a step size of 1, the number of output feature graphs is 12, and each of the convolutional layers is connected to outputs of all the convolutional layers preceding same.

Optionally, a loss function of the deeply and densely connected neural network comprises: a regression loss and a similarity loss, wherein the regression loss is in the form of an L1 loss, the similarity loss is a cross entropy loss, and the total loss function is the sum of the L1 loss and the cross entropy loss.

The loss function of the method of the present application takes into account both the regression loss and the similarity loss, and thus the network can be trained more comprehensively.

Optionally, the deeply and densely connected neural network is trained in the following steps:

a video frame selection step: randomly selecting, from a training video data set, a third video frame and a fourth video frame that contain the same target;

an image generation step: generating a target template image based on the third video frame, and generating a search region image based on the fourth video frame; and a training data generation step: generating a true value of the corresponding bounding box coordinates and a true value of the similarity graph according to the position of a target in the target template image in the search region image, thereby obtaining training data to train the deeply and densely connected neural network.

Optionally, in the image generation step: a portion of an image is intercept from the third video frame by taking bounding box coordinates of a target in the third video frame as the center, the length and width of the portion of the image are M times the length and width of a bounding box respectively, M is greater than 1, and the portion of the image is normalized to obtain the target template image.

Optionally, in the image generation step: in the fourth video frame, center positions of several search regions are determined according to a uniform distribution principle, and the area of the search region is determined to be K times the area of the bounding box, wherein K is greater than 2; and the target is searched for in the fourth video frame, and a search result is normalized to obtain the search region image.

According to a second aspect of the present application, a visual target tracking apparatus based on a deeply and densely connected neural network is further provided, the apparatus comprising:

a data input module configured to input a target image of a first video frame and a second video frame in video data into a deeply and densely connected neural network;

a target tracking module configured to perform, based on the target image, target detection on the second video frame by using the trained deeply and densely connected neural network; and a tracking result output module configured to output bounding box coordinates and a similarity graph of a target in the second video frame, determine the length and width of the target based on the bounding box coordinates, and determine a center position of the target based on the position of a maximum value in the similarity graph.

The apparatus uses the deeply and densely connected neural network to make full use of shallow features, thereby providing more accurate position information for target comparison and tracking.

The above and other objectives, advantages and features of the present application will become more apparent to those skilled in the art according to the detailed descriptions of specific embodiments of the present application below with reference to the accompanying drawings.

BRIEF DESCRIPTION OF THE DRAWINGS

The accompanying drawings described herein are intended to provide a further understanding of the present application, which constitute a part of the present application. The illustrative embodiments of the present application and the description thereof are for explaining the present application and do not constitute an undue limitation of the present application. Some specific embodiments of the present application will be described below in detail in an exemplary but not limiting way with reference to the accompanying drawings. The same reference symbols in the drawings indicate the same or similar components or parts. Those skilled in the art should understand that these accompanying drawings are not necessarily drawn to scale. In the drawings:

FIG. 5 is a schematic flow chart of a visual target tracking method based on a deeply and densely connected neural network according to one embodiment of the present application;

FIGS. 6A, 6B, and 6C are schematic diagrams of target template images obtained by a method according to one embodiment of the present application;

FIGS. 6D, 6E, and 6F are schematic diagrams of search region images obtained by a method according to one embodiment of the present application;

DETAILED DESCRIPTION OF EMBODIMENTS

In order to enable those skilled in the art to better understand the solutions of the present application, the technical solutions in the embodiments of the present application will be clearly and completely described below in conjunction with the accompanying drawings in the embodiments of the present application. Apparently, the described embodiments are merely some of, rather than all, the embodiments of the present application. All other embodiments obtained by a person of ordinary skill in the art based on the embodiments of the present application without creative efforts shall fall within the protection scope of the present application.

It should be noted that the terms "first", "second" and the like in the specification and claims of the present application as well as the above-mentioned accompanying drawings are used to distinguish similar objects, and are not necessarily used to describe a specific order or a precedence order. It should be understood that the data used in this way may be interchanged where appropriate, so that the embodiments of the present application described herein can be implemented in a sequence other than those illustrated or described herein. In addition, the terms "include" and "have" and any variation thereof are intended to cover a non-exclusive inclusion, for example, a process, method, system, product, or device that includes a series of steps or units is not necessarily limited to those steps or units that are explicitly listed, but may include other steps or units not explicitly listed or inherent to such a process, method, product or device.

The present application provides a visual target tracking method based on a deeply and densely connected neural network. It should be noted that the steps illustrated in flow charts of the accompanying drawings may be performed in a computer system such as a set of computer executable instructions; and although a logic sequence is shown in the flow chart, in some cases the steps shown or described may be performed in a sequence different from the sequence described herein.

Figure 1:
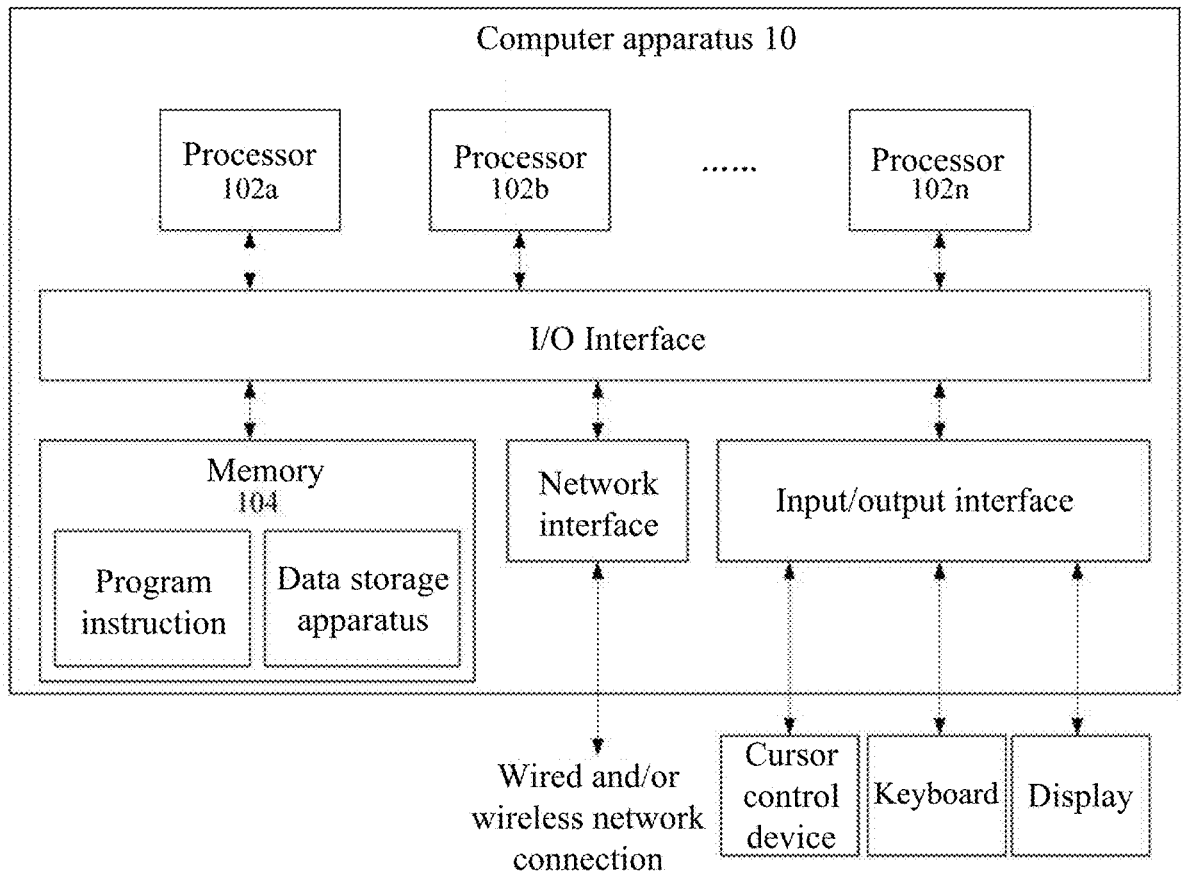
FIG. 1 is a schematic diagram showing a hardware structure of a computer apparatus that performs a visual target tracking method according to one embodiment of the present application.

The method embodiments provided by the present application can be implemented in a mobile terminal, a computer terminal, or a similar computing apparatus. FIG. 1 shows a block diagram of a hardware structure of a computer apparatus (or a mobile device) that performs a method of the present application. As shown in FIG. 1, a computer apparatus 10 (or a mobile device 10) may include one or more processors (shown by 102a, 102b, . . . , 102n, and the processor may include, but is not limited to, a processing apparatus such as a microprocessor MCU or a programmable logic device FPGA), a memory 104 for storing data, and a transmission module for communication functions. Besides, the computer apparatus may further include: a display, an input/output (I/O) interface, a universal serial bus (USB) port (which can be included as one of ports of the I/O interfaces), a network interface, a power supply and/or a camera. It will be understood by those of ordinary skill in the art that the structure shown in FIG. 1 is merely illustrative and does not limit the structure of the above electronic apparatus. For example, the computer apparatus 10 may also include more or fewer components than those shown in FIG. 1, or have a configuration different from that shown in FIG. 1.

It should be noted that one or more of the above-described processors and/or other data processing circuits may be referred to herein generally as "data processing circuits". The data processing circuit may be embodied in whole or in part as software, hardware, firmware or any other combination. Moreover, the data processing circuit may be a single independent processing module, or be incorporated in whole or in part into any of other elements in the computer apparatus 10 (or the mobile device). As referred to in the embodiments of the present application, the data processing circuit acts as a processor control (for example, selection of a variable resistance terminal path to be connected to an interface).

The memory 104 can be used to store software programs and modules of application software, such as program instructions/data storage devices corresponding to the method of the present application, and the processor executes various functional applications and data processing, namely the method of implementing the above applications, by running the software programs and modules stored in the memory 104. The memory 104 may include a high speed random access memory, and may also include a non-volatile memory such as one or more magnetic storage devices, flash memories, or other non-volatile solid state memories. In some examples, the memories 104 may further include memories set remotely from the processor, and these remote memories may be connected to the computer apparatus 10 through a network. Examples of the above network include, but are not limited to, the Internet, intranets, local area networks, mobile communication networks, and combinations thereof.

A transmission device is used for receiving or transmitting data via a network. The specific examples of the network described above may include a wireless network provided by a communication provider of the computer apparatus 10. In one example, the transmission device includes a network interface controller (NIC) that can be connected to other network devices through a base station to communicate with the Internet. In one example, the transmission device may be a radio frequency (RF) module for communicating with the Internet wirelessly.

The display may be, for example, a touch screen type liquid crystal display (LCD) that enables a user to interact with a user interface of the computer apparatus 10 (or the mobile device).

In the above operating environment, the present application provides a based on deep and dense connection-based neural network, which is the basis for implementing a visual target tracking method.

Figure 2:
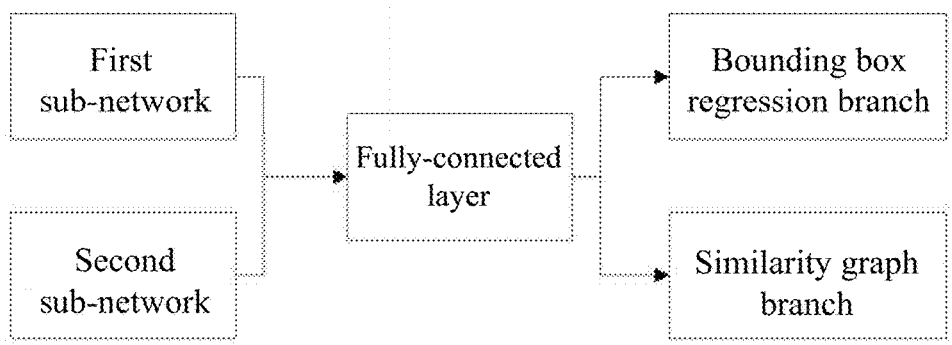
FIG. 2 is a schematic block diagram of a deep and dense connection-based neural network according to one embodiment of the present application.

FIG. 2 is a schematic block diagram of a deep and dense connection-based neural network according to one embodiment of the present application. The deep and dense connection-based neural network provided in this embodiment includes: a first sub-network, a second sub-network, and a fully-connected layer, wherein an input of the first sub-network is the target image of the first video frame, an input of the second sub-network is the second video frame, the first sub-network and the second sub-network are both connected to the fully-connected layer, and the fully-connected layer has two output branches, which are a bounding box coordinate output branch and a similarity graph input branch, respectively. The bounding box coordinate output branch is also referred to as a bounding box regression branch, which directly outputs position coordinates of a target in a search region, and the similarity graph input branch outputs a corresponding similarity graph.

Figure 3:
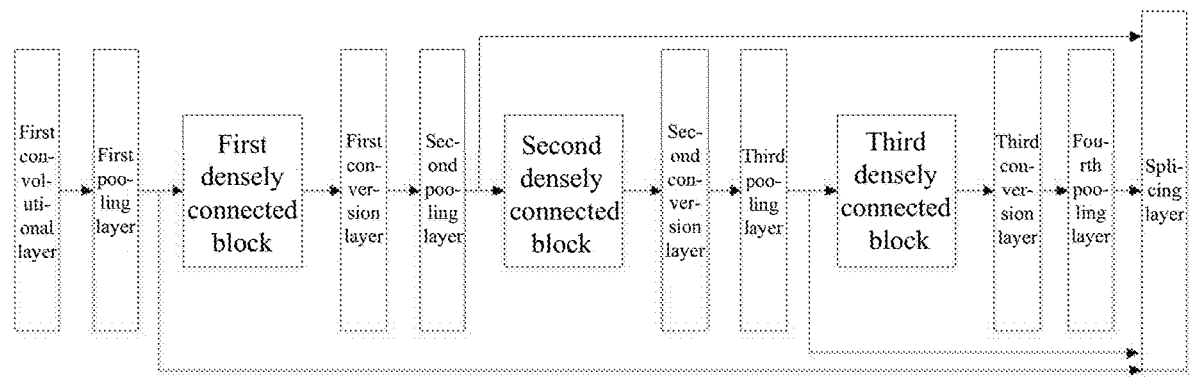
FIG. 3 is a schematic block diagram of a sub-network of a neural network according to one embodiment of the present application.

Optionally, two sub-network structures in the present application can be the same and share parameters. Each sub-network includes one convolutional layer, three densely connected blocks, three conversion layers, four pooling layers, and one splicing layer. FIG. 3 is a schematic block diagram of a sub-network of a neural network according to one embodiment of the present application. The first sub-network and/or the second sub-network comprises: a first convolutional layer, a first pooling layer, a first densely connected block, a first conversion layer, a second pooling layer, a second densely connected block, a second conversion layer, a third pooling layer, a third densely connected block, a third conversion layer, a fourth pooling layer, and a splicing layer which are connected in sequence. The first convolutional layer has a convolution kernel size of 7×7 and a step size of 2, and the number of output feature graphs is 16. Output results of the first pooling layer, the second pooling layer, the third pooling layer, and the fourth pooling layer are respectively input to the splicing layer.

Figure 4:
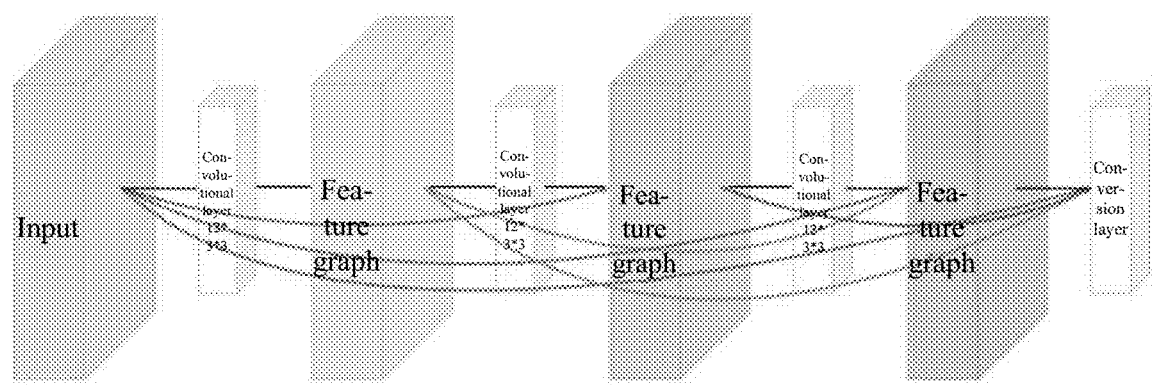
FIG. 4 is a schematic block diagram of a densely connected block of a neural network according to one embodiment of the present application.

FIG. 4 is a schematic block diagram of a densely connected block of a neural network according to one embodiment of the present application. The three densely connected blocks may have the same structure. Each densely connected block includes three convolutional layers. Each convolutional layer has a convolution kernel size of 3×3 and a step size of 1, and the number of output feature graphs is 12. In each densely connected block, each convolutional layer is connected with outputs of all the convolutional layers in front thereof. In the present application, the conversion layers of the three densely connected blocks may have the same network structure, that is, each conversion layer may include two convolutional layers. The convolution kernel sizes of the two convolutional layers are 1×1 and 3×3, respectively, and the step sizes are 1 and 2, respectively. The numbers of output feature graphs are 52, 88, and 124, respectively.

The splicing layer of the deeply and densely connected neural network includes four convolutional layers with a convolution kernel size of 1×1 and a step size of 1. The four convolutional layers are respectively connected to the outputs of the first convolutional layer and the three conversion layers. The output of each convolutional layer is then stretched into a one-dimensional vector and stitched into one vector. The splicing layer is connected to the fully-connected layer. The fully-connected layers in the present application include three fully-connected layers that are sequentially connected and include 4096, 2048, 2048 neurons, respectively. The bounding box regression branch includes four neurons, which correspond to coordinate values of the upper left and lower right corners of an output target respectively. The similarity graph output branch has a size of 19×19, corresponding to a response graph in a search region that is similar to a target template. One pooling layer is connected after the first convolutional layer and a convolutional layer in each conversion layer, and has a step size of 2.

A loss function of the deeply and densely connected neural network includes a regression loss and a similarity loss. The regression loss is the form of an L1 loss (mean absolute error), that is, the L1 loss is calculated according to the coordinate value of each regression and a corresponding true value thereof. The similarity loss is the cross entropy loss, that is, in a 17×17 output response graph, the true value of elements that fall within a target box range is 1, otherwise the value is 0, and the cross entropy loss is calculated by using each element output during training and the true value. The total loss function is the sum of the L1 loss and the cross entropy loss.

An embodiment of the present application further discloses a visual target tracking method based on a deeply and densely connected neural network. FIG. 5 is a schematic flow chart of a visual target tracking method based on a deeply and densely connected neural network according to one embodiment of the present application. The method includes the following steps:

S200: a data input step: inputting a target image of a first video frame and a second video frame in video data into a deeply and densely connected neural network;

S400: a target tracking step: performing, based on the target image, target detection on the second video frame by using the trained deeply and densely connected neural network; and S600: a tracking result output step: outputting bounding box coordinates and a similarity graph of a target in the second video frame, determining the length and width of the target based on the bounding box coordinates, and determining a center position of the target based on the position of a maximum value in the similarity graph.

The method uses the deeply and densely connected neural network to make full use of shallow features, thereby providing more accurate position information for target comparison and tracking.

In the actual use process, a target image obtained by the method in each frame can be used as an input for the target image of the next frame image to perform the target recognition and tracking of the next frame, so that the position to which the target is moving is obtained through the analysis of continuous frames, thereby achieving the continuous tracking of the target. The method has high recognition accuracy and high tracking stability.

The deeply and densely connected neural network in the present application can be trained in the following mode:

a video frame selection step: randomly selecting, from a training video data set, a third video frame and a fourth video frame that contain the same target;

an image generation step: generating a target template image based on the third video frame, and generating a search region image based on the fourth video frame; and a training data generation step: generating a true value of the corresponding bounding box coordinates and a true value of the similarity graph according to the position of a target in the target template image in the search region image, thereby obtaining training data to train the deeply and densely connected neural network.

It should be understood that the third video frame and the fourth video frame herein are merely illustrative. In the actual training process, a large amount of data is used for model training, including the following steps:

collecting video data, and performing bounding box labeling of a target for each video frame in the video data to form a target tracking training data set; where the bounding box labeling can determine coordinates of the minimum rectangular bounding box, and the video data and the bounding box labeling to form the target tracking training data set;

generating the training data for training the deeply and densely connected neural network by using the target tracking training data set; the training data includes: a true value of coordinates of the target in the video frame and a true value of the similarity graph; and generating the training data for training the deeply and densely connected neural network by using the target tracking training data set; the training data includes: a true value of coordinates of the target in the video frame and a true value of the similarity graph.

Optionally, the image generation step may include the following step:

randomly extracting images T1 and T2 of two adjacent frames that contain the same target from the target tracking training data set; where the target is a content in each bounding box; and generating a target template image and a search region image from T1 and T2, respectively, and generating the corresponding true value of the coordinates and the true value of the similarity graph according to the position of the target in the search region. As shown in FIGS. 6A to 6F, FIGS. 6A to 6C show target template images T1, and FIGS. 6D to 6F show search region images T2. Bounding boxes in the figure represent results obtained by the searching in the search region images based on the target template images.

The method for generating the target template image includes the following steps: in the T1 image, intercepting the target template image by taking a target frame as the center, with the size being M times the length and the width of the target frame, for example, twice the length and the width of the target frame; and then, performing normalization operation of subtracting a mean value and dividing by a variance on the target template image.

The method for generating the search region image includes the following steps: in the image T2, determining the center position of search region according to the uniform distribution principle, and determining the area of the search region to be K times the area of the bounding box, where K is greater than 2 For example, the length and/or width of the search region can be determined within a range of 1.6 to 2.4 times the length and/or width of the target frame, at the same time it is ensured that the emerging area of the target in the search region is 0.5 or more times its own area, and then the normalization operation of subtracting a mean value and dividing by a variance is performed on the search result to obtain the search region image.

The method for generating a true value of target coordinates is as follows: The position coordinates of the search region in which the target object is actually located are in the form of [x0, y0, x1, y1], which are the x coordinates of the upper left corner of the target, the y coordinates of the upper left corner, the x coordinates of the lower right corner, and the y coordinates of the lower right corner, respectively, and the position coordinates are normalized into the interval between 0 to 1 respectively.

The method for generating a true value of the similarity graph is as follows: according to the position of the target in the search region, an element in the similarity graph within the target range is set to 1; otherwise, the element is set to 0. The similarity graph has a size of 17×17.

After training data is obtained, the training data is used to train the deeply and densely connected convolutional neural network. During the training process, the initial learning rate, the batch size, and the maximum number of training rounds of the network can be set.

When target recognition and tracking are performed by using the deeply and densely connected neural network, video frames can be analyzed one by one by inputting each video frame in the target template image and the video data, thereby outputting the target position and similarity graph in the video frame.

Figure 7:
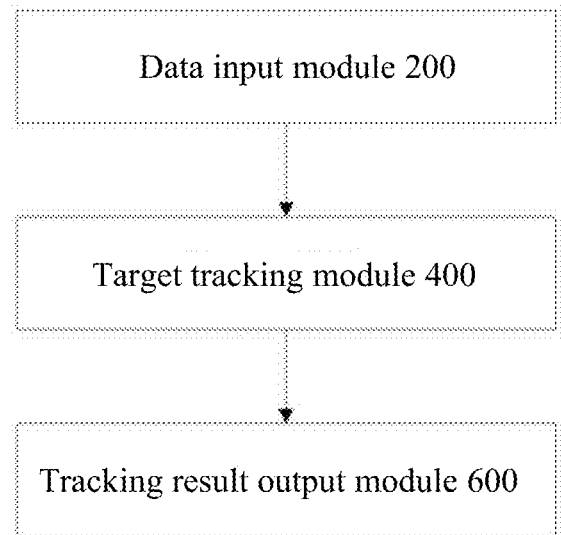
FIG. 7 is a schematic block diagram of a visual target tracking apparatus based on a deeply and densely connected neural network according to one embodiment of the present application.

According to an embodiment of the present application, a visual target tracking apparatus based on a deeply and densely connected neural network is further provided. FIG. 7 is a schematic block diagram of a visual target tracking apparatus based on a deeply and densely connected neural network according to one embodiment of the present application. The apparatus may include:

a data input module 200 configured to input a target image of a first video frame and a second video frame in video data into a deeply and densely connected neural network;

a target tracking module 400 configured to perform, based on the target image, target detection on the second video frame by using the trained deeply and densely connected neural network; and a tracking result output module 600 configured to output bounding box coordinates and a similarity graph of a target in the second video frame, determine the length and width of the target based on the bounding box coordinates, and determine a center position of the target based on the position of a maximum value in the similarity graph.

The apparatus uses the deeply and densely connected neural network to make full use of shallow features, thereby providing more accurate position information for target comparison and tracking.

The apparatus of the present application further includes a training module for training a deeply and densely connected neural network. The training module includes:

a video frame selection module configured to randomly select, from a training video data set, a third video frame and a fourth video frame that contain the same target;

an image generating module configured to generate a target template image based on the third video frame, and generate a search region image based on the fourth video frame; and a training data generation module configured to generate a true value of the corresponding bounding box coordinates and a true value of the similarity graph according to the position of a target in the target template image in the search region image, thereby obtaining training data to train the deeply and densely connected neural network.

Figure 8:
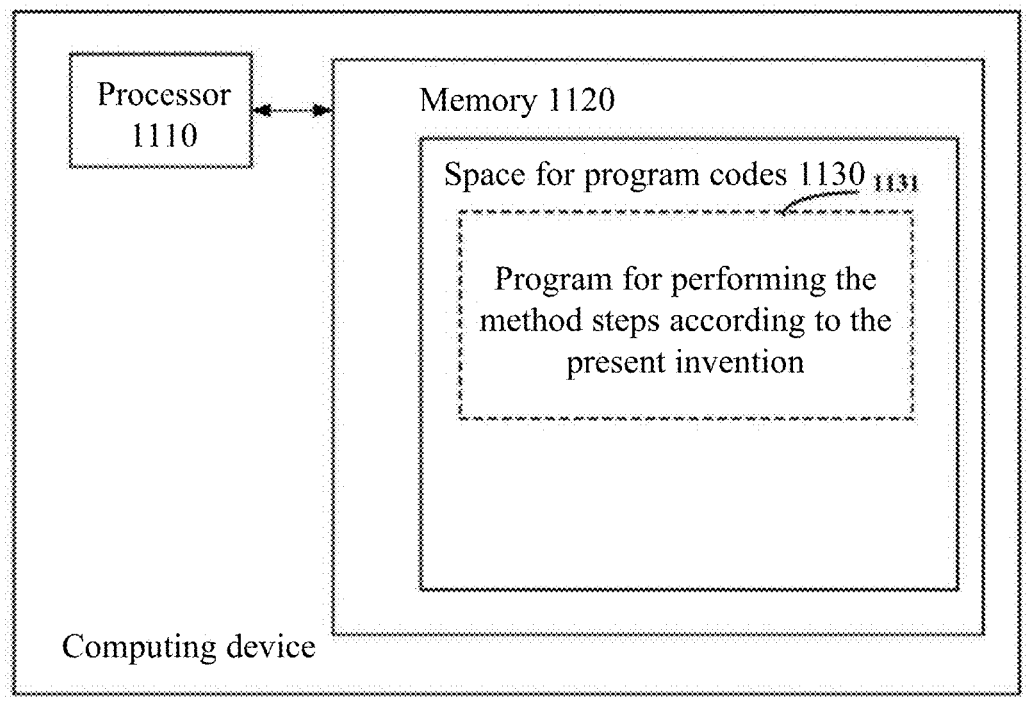
FIG. 8 is a block diagram of one embodiment of a computing device of the present application.

An aspect of an embodiment of the present application provides a computing device. Referring to FIG. 8, the computing device includes a memory 1120, a processor 1110, and a computer program stored in the memory 1120 and executable by the processor 1110. The computer program is stored in a space 1130 for program code in the memory 1120. The computer program, when executed by the processor 1110, is implemented to perform any of steps 1131 of the method in accordance with the present application.

Figure 9:
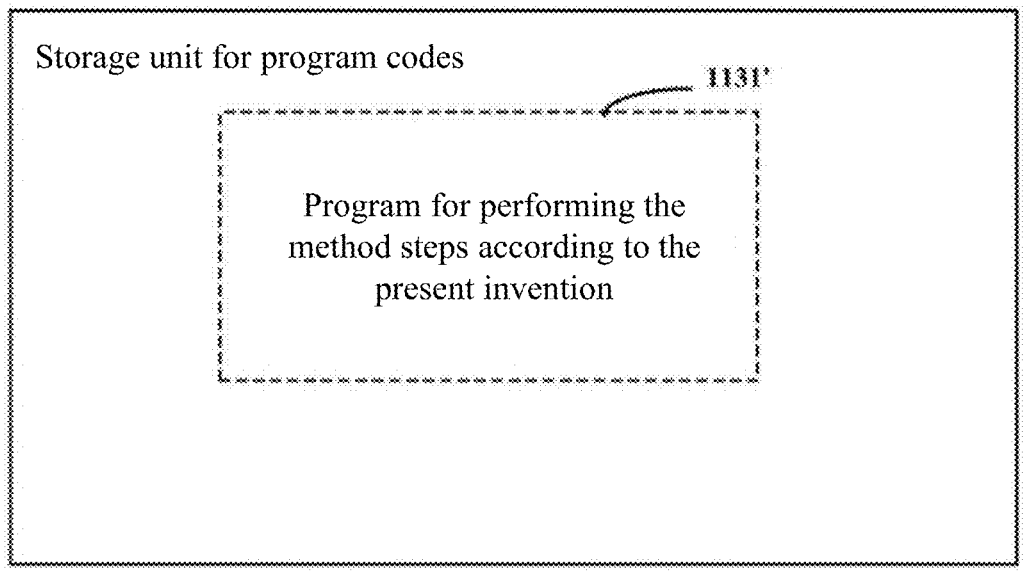
FIG. 9 is a block diagram of an embodiment of a computer readable storage medium of the present application.

An aspect of an embodiment of the present application further provides a computer readable storage medium. Referring to FIG. 9, the computer readable storage medium includes a storage unit for program code. The storage unit is provided with a program 1131' for performing the steps of the method in accordance with the present application, and the program is executed by a processor.

An aspect of an embodiment of the present application further provides a computer program product including instructions, and the computer program product includes computer readable code that, when executed by a computing device, causes the computing device to perform the method as described above.

The above embodiments may be implemented in whole or in part by software, hardware, firmware, or any combination thereof. When implemented by using the software, the embodiment may be implemented in whole or in part in the form of a computer program product. The computer program product includes one or more computer instructions. When the computer program instructions are loaded into and executed by a computer, the processes or functions described in accordance with embodiments of the present application are conducted in whole or in part. The computer may be a general purpose computer, a special purpose computer, a computer network, or other programmable device. The computer instructions can be stored in a computer readable storage medium or transmitted from one computer readable storage medium to another computer readable storage medium. For example, the computer instructions can be transmitted from a website, computer, server or data center to another web site site, computer, server, or data center in a wired mode (such as a coaxial cable, an optical fiber, or a digital subscriber line (DSL)) or a wireless mode (such as infrared, Wi-Fi, or microwave). The computer readable storage medium may be any available medium that can be accessed by a computer or a data storage device such as an integrated server data center that includes one or more available mediums. The available medium may be a magnetic medium (such as a floppy disk, a hard disk, or a magnetic tape), an optical medium (such as a DVD), or a semiconductor medium (such as a solid state disk (SSD)), or the like.

A person skilled in the art should be further aware that the unit and algorithm steps of the various examples described in conjunction with the embodiments disclosed herein can be implemented in electronic hardware, computer software, or a combination of both. In order to clearly illustrate hardware and software interchangeability, the compositions and steps of the various examples have been generally described in terms of function in the above description. Whether these functions are performed in hardware or software depends on the specific application and design constraints of the solution. A person skilled in the art can use different methods for each specific application to implement the described functions, but such implementation should not be considered to be beyond the scope of the present application.

It will be understood by those of ordinary skill in the art that all or some steps in the method for implementing the above embodiments may be completed by instructing a processor via a program. The program may be stored in a computer readable storage medium, and the storage medium is a non-transitory medium, such as a random access memory, a read-only memory, a flash memory, a hard disk, a solid state disk, a magnetic tape, a floppy disk, or an optical disc, or any combination thereof.

The above description is only preferred embodiments of the present application, but the protection scope of the present application is not limited thereto, and variations and replacements that can be easily conceived within the technical scope disclosed in the present application by any person skilled in the art should fall within the protection scope of the present application. Therefore, the protection scope of the present application should be defined by the protection scope of the claims.

What is claimed is:

1. A visual target tracking method based on a deeply and densely connected neural network, comprising the following steps:
    a data input step: inputting a target image of a first video frame and a second video frame in video data into the deeply and densely connected neural network;
    a target tracking step: performing, based on the target image, a target detection on the second video frame by using a trained deeply and densely connected neural network; and
    a tracking result output step: outputting bounding box coordinates and a similarity graph of a target in the second video frame, determining a length and a width of the target based on the bounding box coordinates, and determining a center position of the target based on a position of a maximum value in the similarity graph;
    wherein
    the deeply and densely connected neural network comprises: a first sub-network, a second sub-network, and a fully-connected layer, wherein an input of the first sub-network is the target image of the first video frame, an input of the second sub-network is the second video frame, the first sub-network and the second sub-network are both connected to the fully-connected layer, and the fully-connected layer has two output branches including a bounding box coordinate output branch and a similarity graph output branch.

2. The method according to claim 1, wherein the first sub-network and the second sub-network have a same structure and share parameters.

3. The method according to claim 1, wherein the first sub-network and/or the second sub-network comprises: a first convolutional layer, a first pooling layer, a first densely connected block, a first conversion layer, a second pooling layer, a second densely connected block, a second conversion layer, a third pooling layer, a third densely connected block, a third conversion layer, a fourth pooling layer, and a splicing layer connected in sequence.

4. The method according to claim 3, wherein the first densely connected block, the second densely connected block and the third densely connected block have a same structure, each comprising: three convolutional layers, wherein each of the three convolutional layers has a convolution kernel size of 3×3 and a step size of 1, a number of output feature graphs is 12, and each of the three convolutional layers is connected to outputs of all preceding convolutional layers.

5. The method according to claim 1, wherein a loss function of the deeply and densely connected neural network comprises; a regression loss and a similarity loss, wherein the regression loss is in a form of an L1 loss, the similarity loss is a cross entropy loss, and a total loss function of the loss function is a sum of the L loss and the cross entropy loss.

6. The method according to claim 1, wherein the deeply and densely connected neural network is trained in the following steps:
    a video frame selection step: randomly selecting, from a training video data set, a third video frame and a fourth video frame containing a same target;
    an image generation step: generating a target template image based on the third video frame, and generating a search region image based on the fourth video frame; and
    a training data generation step: generating a true value of corresponding bounding box coordinates and a true value of the similarity graph according to a position of the target in the target template image in the search region image, thereby obtaining training data to train the deeply and densely connected neural network.

7. The method according to claim 6, wherein in the image generation step: a portion of an image is intercepted from the third video frame by taking bounding box coordinates of a target in the third video frame as a center, wherein a length and a width of the portion of the image are M times a length and a width of a bounding box respectively, M is greater than 1, and the portion of the image is normalized to obtain the target template image.

8. The method according to claim 6, wherein in the image generation step: in the fourth video frame, center positions of a plurality of search regions are determined according to a uniform distribution principle, and an area of each of the search regions is determined to be K times an area of g bounding box, wherein K is greater than 2; and the target is searched for in the fourth video frame, and a search result is normalized to obtain the search region image.

9. A visual target tracking apparatus based on a deeply and densely connected neural network, comprising:
    a data input module configured to input a target image of a first video frame and a second video frame in video data into the deeply and densely connected neural network;
    a target tracking module configured to perform, based on the target image, a target detection on the second video frame by using a trained deeply and densely connected neural network; and
    a tracking result output module configured to output bounding box coordinates and a similarity graph of a target in the second video frame, determine a length and a width of the target based on the bounding box coordinates, and determine a center position of the target based on a position of a maximum value in the similarity graph;
    wherein
    the deeply and densely connected neural network comprises: a first sub-network, a second sub-network, and a fully-connected layer, wherein an input of the first sub-network is the target image of the first video frame, an input of the second sub-network is the second video frame, the first sub-network and the second sub-network are both connected to the fully-connected layer, and the fully-connected layer has two output branches including a bounding box coordinate output branch and a similarity graph output branch.

10. The method according to claim 2, wherein the deeply and densely connected neural network is trained in the following steps:
- a video frame selection step: randomly selecting, from a training video data set, a third video frame and a fourth video frame containing a same target;
- an image generation step: generating a target template image based on the third video frame, and generating a search region image based on the fourth video frame; and
- a training data generation step: generating a true value of corresponding bounding box coordinates and a true value of the similarity graph according to a position of the target in the target template image in the search region image, thereby obtaining training data to train the deeply and densely connected neural network.

11. The method according to claim 3, wherein the deeply and densely connected neural network is trained in the following steps:
- a video frame selection step: randomly selecting, from a training video data set, a third video frame and a fourth video frame containing a same target;
- an image generation step: generating a target template image based on the third video frame, and generating a search region image based on the fourth video frame; and
- a training data generation step: generating a true value of corresponding bounding box coordinates and a true value of the similarity graph according to a position of the target in the target template image in the search region image, thereby obtaining training data to train the deeply and densely connected neural network.

12. The method according to claim 4, wherein the deeply and densely connected neural network is trained in the following steps:
- a video frame selection step: randomly selecting, from a training video data set, a third video frame and a fourth video frame containing a same target;
- an image generation step: generating a target template image based on the third video frame, and generating a search region image based on the fourth video frame; and
- a training data generation step: generating a true value of corresponding bounding box coordinates and a true value of the similarity graph according to a position of the target in the target template image in the search region image, thereby obtaining training data to train the deeply and densely connected neural network.

13. The method according to claim 5, wherein the deeply and densely connected neural network is trained in the following steps:
- a video frame selection step: randomly selecting, from a training video data set, a third video frame and a fourth video frame containing a same target;
- an image generation step: generating a target template image based on the third video frame, and generating a search region image based on the fourth video frame; and
- a training data generation step: generating a true value of corresponding bounding box coordinates and a true value of the similarity graph according to a position of the target in the target template image in the search region image, thereby obtaining training data to train the deeply and densely connected neural network.

* * * * *